Patented May 13, 1947

2,420,563

UNITED STATES PATENT OFFICE 2,420,563

CATALYST AND PROCESS FOR DEHYDROGENATION OF HYDROCARBONS

Peter William Reynolds, Arthur William Charles Taylor, and John George Mackay Bremner, Norton-on-Tees, England, assignors to Imperial Chemical Industries Limited, a corporation of Great Britain No Drawing. Application December 21, 1942, Serial No. 469,718. In Great Britain August 25, 1941

4 Claims. (Cl. 260—683.3)

This invention relates to catalysts suitable for use in dehydrogenation reactions and especially in the dehydrogenation of hydrocarbons to olefines and diolefines containing the same number of carbon atoms.

Catalysts essentially consisting of or containing substantial amounts of oxides of aluminum and chromium are known to be suitable for the dehydrogenation of hydrocarbons. The methods disclosed for the preparation of these catalysts include, for example, that of impregnating Activated Alumina, e. g., in the form of porous calcined granules, with a chromic acid solution.

These known catalysts when used for example in the dehydrogenation of paraffin hydrocarbons to the corresponding olefines, deteriorate in activity and have carbonaceous material deposited on them during the dehydrogenation, but they can be regenerated by interrupting the dehydrogenation process and passing an oxygen-containing gas over them at an elevated temperature.

In practice, therefore, the dehydrogenation is carried out in a series of cycles of alternating periods of dehydrogenation and regeneration. The decrease in activity which occurs from the moment when dehydrogenation is commenced to the moment when it is interrupted and regeneration started, is hereinafter termed "intracyclic deterioration."

We have found that when these known catalysts are used for many cycles of dehydrogenation and regeneration, a decrease in the mean activity in each dehydrogenation period gradually becomes evident. The regeneration process, therefore, does not fully restore the activity of these known catalysts. The degree of restoration obtained by the regeneration process decreases with increase in temperature of the dehydrogenation and the regeneration.

In co-pending application Serial Number 398,680, filed June 18, 1941, now U. S. Patent 2,382,394 issued August 14, 1945, there is described an improved catalyst suitable for dehydrogenation reactions which comprises as its essential constituent a product obtained by cautious thermal decomposition of a precipitate produced from an aqueous solution containing an aluminum salt, together with ammonium chromate, ammonium dichromate or chromium trioxide, by adding thereto ammonia, ammonium bicarbonate or ammonium carbonate in an amount at least sufficient to give substantially complete precipitation of the aluminium.

We have now found a catalyst comparable with that described in copending application Serial Number 398,680, which for any given temperature of dehydrogenation and regeneration can be more completely regenerated than the known catalysts can be under the same conditions, and which moreover, when employed at temperatures of the order of 500° C. to 600° C. does not show any appreciable fall in mean activity per cycle, after use in numerous alternate cycles of dehydrogenation and regeneration.

The catalyst of the present invention comprises as its essential constituent a product obtained by the cautious thermal decomposition of a precipitate produced from an aqueous solution containing an aluminium salt by adding thereto ammonia, ammonium bicarbonate or ammonium carbonate in an amount at least sufficient to give substantially complete precipitation of the aluminium, the said aqueous solution being substantially free from any chromate, dichromate or chromium trioxide during the precipitation step, the said precipitate being impregnated with ammonium chromate or ammonium dichromate before the cautious thermal decomposition step.

Aluminium nitrate has been found to be a convenient aluminium salt for use in the preparation of the catalyst. Any soluble aluminium salt may, however, be used, e. g., aluminium chloride or its dehydrated forms, or aluminium sulphate.

The substantially complete precipitation of the aluminium with ammonia or its carbonate salts may be carried out at any temperature from the freezing point to the boiling point of the solution. Ammonia may be used either as a gas or in aqueous solution, while ammonium bicarbonate and ammonium carbonate are most conveniently used as solutions in water. The amount of precipitating agent does not appear to be critical, but it is preferred to add just sufficient to obtain substantially complete precipitation. The precipitate, after separation from the mother liquor, should not be subjected to any extensive washing and in general it is desirable that the precipitate should not be washed at all.

The precipitate, after separation of the mother liquor, may be impregnated with ammonium chromate or ammonium dichromate in any convenient manner, for example by suspending it in an aqueous solution of the desired salt, impregnation being assisted by stirring the suspension.

The thermal decomposition of the precipitate is carried out by heating it slightly in order to start the reaction, and then continuing to heat carefully until the reaction is substantially complete. In view of the exothermal nature of the decomposition, care should be taken to avoid the development of high local temperatures, for example, by suitable disposition or agitation of the precipitate. It appears that the decomposition should take place at as low a temperature as possible for the best results. The decomposition is conveniently carried out in air, but other atmospheres, such as steam, nitrogen or hydrogen, may be used.

We have further found that intracyclic deterioration of the catalyst and carbonaceous deposition can be decreased by the presence in the catalyst of a compound of the alkali metals or the chromite, chromate, or dichromate of zinc.

The chromates of the alkali metals have been found to be better than other alkali metal compounds, and the compounds of zinc hereinbefore mentioned. Potassium compounds in general appear to give better results than the corresponding compounds of the other alkali metals and potassium chromate is outstandingly better than all other compounds tested.

In the early stages of the life of a catalyst containing potassium chromate, carbon deposition is very small and intracyclic deterioration is almost absent. On prolonged subjection to alternate cycles of dehydrogenation and regeneration, carbon deposition increases to a limiting value, and intracyclic deterioration appears, but both are lower than for a catalyst containing no potassium chromate.

In general the alkali metal compounds should be present in an amount by weight between 0.05% and 5.0% of the product obtained by the thermal decomposition hereinbefore described. The corresponding percentages in the case of the zinc compounds in general lie between 0.05% and 10.0%.

The alkali metal and zinc compounds may be introduced into the catalyst in any suitable manner, e. g., by addition as such or by production in situ, and at any convenient stage in or after the manufacture of the essential constituent of the catalyst. We prefer, however, to mix the alkali metal and zinc compounds with the previously prepared essential constituent, make the mixture into a slurry with water, and finally dry it.

The catalysts of this invention may have incorporated in them other compounds such as the oxides of magnesium, aluminum, and zinc, and may be used supported on suitable carriers or in the form of granules or as pellets.

The activity of the catalysts of this invention is influenced by the amount of water vapour present in the material to be hydrogenated. For any given raw material, the amounts of water which are suitable can easily be determined by a few simple experiments.

As examples of dehydrogenation processes for which our catalysts are useful, there may be cited the dehydrogenation of hydrocarbons such as the conversion of paraffin hydrocarbons to olefines containing the same number of carbon atoms, and the production of diolefines from olefines.

In order to illustrate the action of the catalysts of this invention, the following example is given of their use in the dehydrogenation of a paraffin hydrocarbon.

*Example*

1490 grams of aluminium nitrate $(Al(NO_3)_3.9H_2O)$ were dissolved in 2,000 grams of water, and aqueous ammonia containing 25% by weight of $NH_3$ was added to it until precipitation was complete. The precipitate was filtered, washed with 1 litre of water and then placed in a solution of 756 grams of ammonium dichromate in 3,000 grams of water and the whole thoroughly stirred for 1 hour. The precipitate was then separated from the solution by filtration, and dried without being washed. The dried precipitate was then cautiously decomposed by heating it in small portions in a porcelain dish over a low flame; the powder being vigorously stirred to prevent excessive heating by bursts of spontaneous decomposition. The highly exothermic decomposition began at 120° C., and was substantially completed by raising the temperature of the powder to 350° C. The material was finally heated in dry air to 500° C., maintained at this temperature for 1 hour, and cooled.

The powdered catalyst prepared in the manner described, was mixed with 4% by weight of aluminium stearate and pelleted to 1/8" x 1/8" cylinders. These were finally calcined in air up to 500° C., to remove the organic material of the pelleting lubricant.

Substantially pure propane, dried by passage over fused calcium chloride, was passed over this catalyst at the rate of 2000 volumes of propane (measured at 20° C., and 1 atmosphere pressure) per volume of catalyst space per hour, the temperature being maintained at 600° C. An average sample of the exit gas taken over the first half-hour of the run contained 21% olefines, of which more than 95% was propylene.

We claim:

1. The process for forming a dehydrogenation catalyst composition comprising the steps of adding to an aqueous aluminum salt solution, free of chromium, a substance selected from the group consisting of ammonia and carbonates of ammonia in an amount sufficient to precipitate substantially all of the aluminum present in said solution, impregnating the hydrous aluminum oxide precipitate with a substance selected from the group consisting of ammonium chromate and ammonium dichromate, adding to the resulting impregnated hydrous aluminum oxide a minor amount of a substance selected from the group consisting of a chromite, chromate and dichromate of zinc and alkali metals, and then cautiously thermally decomposing the resulting product.

2. The process for forming a dehydrogenation catalyst composition which comprises adding to an aqueous aluminum salt solution, free of chromium, a substance selected from the group consisting of ammonia and carbonates of ammonia in amount sufficient to precipitate substantially all of the aluminum present in said solution, impregnating the resulting hydrous aluminum oxide precipitate with a substance selected from the group consisting of ammonium chromate and ammonium dichromate, adding to the resulting impregnated hydrous aluminum oxide from about 0.05% to 5% by weight of an alkali metal compound from the group consisting of chromates and dichromates, and then cautiously thermally decomposing the resulting product.

3. The process for forming a dehydrogenation catalyst composition which comprises adding to an aqueous aluminum salt solution, free of chromium, a substance selected from the group consisting of ammonia and carbonates of ammonia in amount sufficient to precipitate substantially all of the aluminum present in said solution, impregnating the resulting hydrous aluminum oxide precipitate with a substance selected from the group consisting of ammonium chromate and ammonium dichromate, adding to the resulting impregnated hydrous aluminum oxide from about 0.05% to 10% by wegiht of a zinc compound from the group consisting of chromates and dichromates, and then cautiously thermally decomposing the resulting product.

4. A process for dehydrogenating hydrocarbons which comprises effecting said dehydrogenation in the presence of a catalyst composition obtained by adding to an aqueous aluminum salt solution, free of chromium, a substance selected from the group consisting of ammonia and carbonates of ammonia in an amount sufficient to precipitate substantially all of the aluminum present in said solution, impregnating the hydrous aluminum oxide precipitate with a substance selected from the group consisting of ammonium chromate and ammonium dichromate, adding to the resulting impregnated hydrous aluminum oxide a minor amount of a substance selected from the group consisting of a chromite, chromate and dichromate of zinc and alkali metals, and then cautiously thermally decomposing the resulting product.

PETER WILLIAM REYNOLDS.
ARTHUR WILLIAM CHARLES TAYLOR.
JOHN GEORGE MACKAY BREMNER.

REFERENCES CITED

The following references are of record in the file of this patent:

UNITED STATES PATENTS

| Number | Name | Date |
| --- | --- | --- |
| 2,231,446 | Grosse | Feb. 11, 1941 |
| 2,249,337 | Visser et al. | July 15, 1941 |
| 2,102,160 | Nashan | Dec. 14, 1937 |
| 2,122,788 | Tropsch | July 5, 1938 |
| 2,183,591 | Schulze | Dec. 19, 1939 |
| 2,204,619 | Pier et al. | June 18, 1940 |
| 2,209,908 | Weiss | July 30, 1940 |
| 2,288,336 | Welty et al. | June 30, 1942 |
| 2,296,406 | Spicer et al. | Sept. 22, 1942 |
| 2,172,534 | Grosse II | Sept. 12, 1939 |
| 2,184,235 | Groll | Dec. 19, 1939 |
| 2,257,082 | Yarnall | Sept. 23, 1941 |
| 2,278,223 | Sturgeon | Mar. 31, 1942 |
| 2,322,863 | Marschner | June 29, 1943 |
| 2,178,761 | Lazier | Nov. 7, 1939 |
| 2,294,414 | Matuszak | Sept. 1, 1942 |
| 2,096,769 | Tropsch | Dec. 24, 1934 |
| 2,325,287 | Thomas | July 27, 1943 |

FOREIGN PATENTS

| Number | Country | Date |
| --- | --- | --- |
| 392,954 | Great Britain | May 22, 1933 |
| 504,614 | Great Britain | Apr. 24, 1939 |